United States Patent [19]

Cheng

[11] Patent Number: 5,190,721
[45] Date of Patent: Mar. 2, 1993

[54] ZIRCONIUM-BISMUTH-NIOBIUM ALLOY FOR NUCLEAR FUEL CLADDING BARRIER

[75] Inventor: Bo C. Cheng, Cupertino, Calif.

[73] Assignee: General Electric Company, Schenectady, N.Y.

[21] Appl. No.: 812,465

[22] Filed: Dec. 23, 1991

[51] Int. Cl.$^5$ ............................................. G21C 3/00
[52] U.S. Cl. .................................... 376/417; 376/416
[58] Field of Search ............... 376/412, 416, 414, 417; 428/636; 420/422; 148/421

[56] References Cited

U.S. PATENT DOCUMENTS

| | | | |
|---|---|---|---|
| 4,200,492 | 4/1980 | Armijo et al. | 376/417 |
| 4,775,508 | 10/1988 | Sabol et al. | 376/416 |
| 4,876,064 | 10/1989 | Taylor | 420/422 |
| 4,894,203 | 1/1990 | Adamson | 376/416 |
| 5,026,516 | 6/1991 | Taylor | 376/414 |
| 5,071,618 | 12/1991 | Sanchez-Caldera et al. | 419/12 |
| 5,080,861 | 1/1992 | Garde | 420/422 |

OTHER PUBLICATIONS

"Creep and stress-rupture of high strength zirconium alloys", E. F. Ibrahim, E. G. Price, A. G. Wysiekierski, Canadian Metallurgical Quarterly, vol. 11, No. 1, (1972), pp. 273-283.

"A Study on the Zirconium Alloys for Nuclear Reactor with High Strength at Elevated Temperatures", Goro Ito, Ryukiti R. Hashiguti, Masayoshi Hasegawa, Yoshitsugu Mishima, Fumio Sawayanagi, Yoshihiko Shimizu, Transactions of National Research Institute for Metals, vol. 6, No. 4, (1964), pp. 21-25.

Primary Examiner—Donald P. Walsh
Assistant Examiner—Neena Chelliah
Attorney, Agent, or Firm—James E. McGinness; James Magee, Jr.

[57] ABSTRACT

A corrosion resistant zirconium alloy is comprised of, in weight percent, about 0.1 to less than 0.5 percent bismuth, about 0.1 to less than 0.5 percent niobium, and the balance substantially zirconium. Preferably, niobium is about 0.1 to 3 weight percent. The alloys have improved corrosion resistance as compared to the moderate-purity sponge zirconium while maintaining a ductility comparable to sponge zirconium.

8 Claims, 2 Drawing Sheets

ZIRCONIUM-BISMUTH-NIOBIUM ALLOY FOR NUCLEAR FUEL CLADDING BARRIER

BACKGROUND OF THE INVENTION

This invention relates broadly to zirconium alloys, and more specifically to corrosion resistant and ductile zirconium alloys.

Improved zirconium and zirconium alloy nuclear fuel cladding tubes are disclosed in U.S. Pat. Nos. 4,200,492 and 4,372,817, incorporated herein by reference. A composite cladding tube described therein comprises a barrier layer of either high purity zirconium (such as crystal bar zirconium) or moderate purity zirconium (such as sponge zirconium) metallurgically bonded on the inside surface of a zirconium alloy tube. The composite cladding encloses the nuclear fuel material, leaving a gap between the fuel and the cladding. The barrier layer shields the alloy tube from the nuclear fuel material held in the cladding as well as shielding the alloy tube from fission products and gases. The barrier layer typically has a thickness equal to about 1 to about 30 percent of the thickness of the composite cladding. The barrier layer remains relatively soft during irradiation and minimizes localized strain inside the nuclear fuel elements, thus serving to protect the alloy tube from both stress corrosion cracking and liquid metal embrittlement. The alloy tube portion of the cladding is otherwise unchanged in design and function from previous practice for a nuclear reactor and is selected from conventional cladding material, such as zirconium alloys.

It is disclosed in U.S. Pat. Nos. 4,200,492 and 4,372,817 that the high and moderate purity zirconium metal forming the metal barrier in the composite cladding, even after prolonged irradiation, is able to maintain desirable structural properties such as yield strength and hardness at levels considerably lower than those of conventional zirconium alloys. In effect, the metal barrier does not harden as much as conventional zirconium alloys when subjected to irradiation, and this together with its initially low yield strength enables the metal barrier to deform plastically and relieve pellet-induced stresses in the fuel element during transients in neutron radiation. Fuel pellet induced stresses in the fuel element can be brought about, for example, by swelling of the pellets of nuclear fuel at reactor operating temperatures (300° to 350° C.) so that the pellet comes into contact with the cladding.

The nuclear fuel elements described in U.S. Pat. Nos. 4,200,492 and 4,372,817 provide a substantial improvement over elements which do not include internal zirconium barrier layers. However, the relatively pure zirconium barrier layers are subject to oxidation if the composite cladding is breached and water or steam enters the fuel rod during operation of the reactor. It would thus be desirable to improve the oxidation resistance in the barrier layer. It would be particularly desirable if such oxidation inhibition can be achieved without reducing the effectiveness of the zirconium barrier layer, particularly the ability of the barrier layer to deform plastically and relieve pellet-induced stresses in the fuel element during transients in radiation.

U.S. Pat. No. 4,894,203, incorporated herein by reference, discloses an improved nuclear fuel cladding having an alloy layer formed as a thin layer on the inner barrier layer, the alloy layer having less than one percent by weight of one or more impurities from the group consisting of iron, chromium, copper, nitrogen, and niobium. The alloy layer can be formed by any conventional method having control over the deposition depth of the impurity elements, such as ion implantation, ion plating, or chemical vapor deposition. The alloy layer provides improved oxidation resistance to the barrier layer without substantially affecting the desired plastic properties of the barrier layer.

U.S. Pat. No. 4,876,064, incorporated herein by reference, discloses corrosion resistant zirconium alloys comprised of 0.5 to 2.5 weight percent bismuth, or alternatively, 0.5 to 2.5 weight percent of a mixture of tin and bismuth, and 0.5 to 1.0 weight percent of a solute from the group consisting of niobium, molybdenum, tellurium, and mixtures thereof, and the balance zirconium. The alloys have a high resistance to both uniform and nodular corrosion as shown by laboratory high pressure steam testing that simulates the uniform and nodular corrosion that can be found on nuclear fuel rod cladding in the core of a nuclear reactor.

It is an object of this invention to provide a zirconium based alloy having an improved combination of corrosion resistance and ductility.

It is another object of this invention to provide a corrosion resistant zirconium alloy having ductility comparable to sponge zirconium.

It is another object of this invention to provide a corrosion resistant zirconium alloy having an improved combination of corrosion resistance and ductility suitable for barrier layers in nuclear fuel cladding.

BRIEF DESCRIPTION OF THE INVENTION

The corrosion resistant zirconium alloys of this invention are comprised of, in weight percent, about 0.1 to less than 0.5 percent bismuth, about 0.1 to less than 0.5 percent niobium, and the balance substantially zirconium. Preferably, niobium is about 0.1 to 3 weight percent. The alloys have improved corrosion resistance as compared to the moderate-purity sponge zirconium while maintaining a ductility comparable to sponge zirconium.

DETAILED DESCRIPTION OF THE INVENTION

The alloys of this invention can be melted by methods similar to conventional methods for alloying zirconium. The alloying is accomplished preferably by arc melting a zirconium billet having the desired amount of the alloying metals encased in a hollow portion of the billet. The alloys of this invention can contain the conventional impurities found in sponge zirconium and zirconium alloys in conformance with ASTM B 349, 1991 Annual Book of ASTM Standards, Vol. 12.01, pp. 1-2, incorporated herein by reference. The melt is cast as an alloy billet, which can be finished by conventional zirconium alloy processing methods to produce the final shapes.

Figure 1:
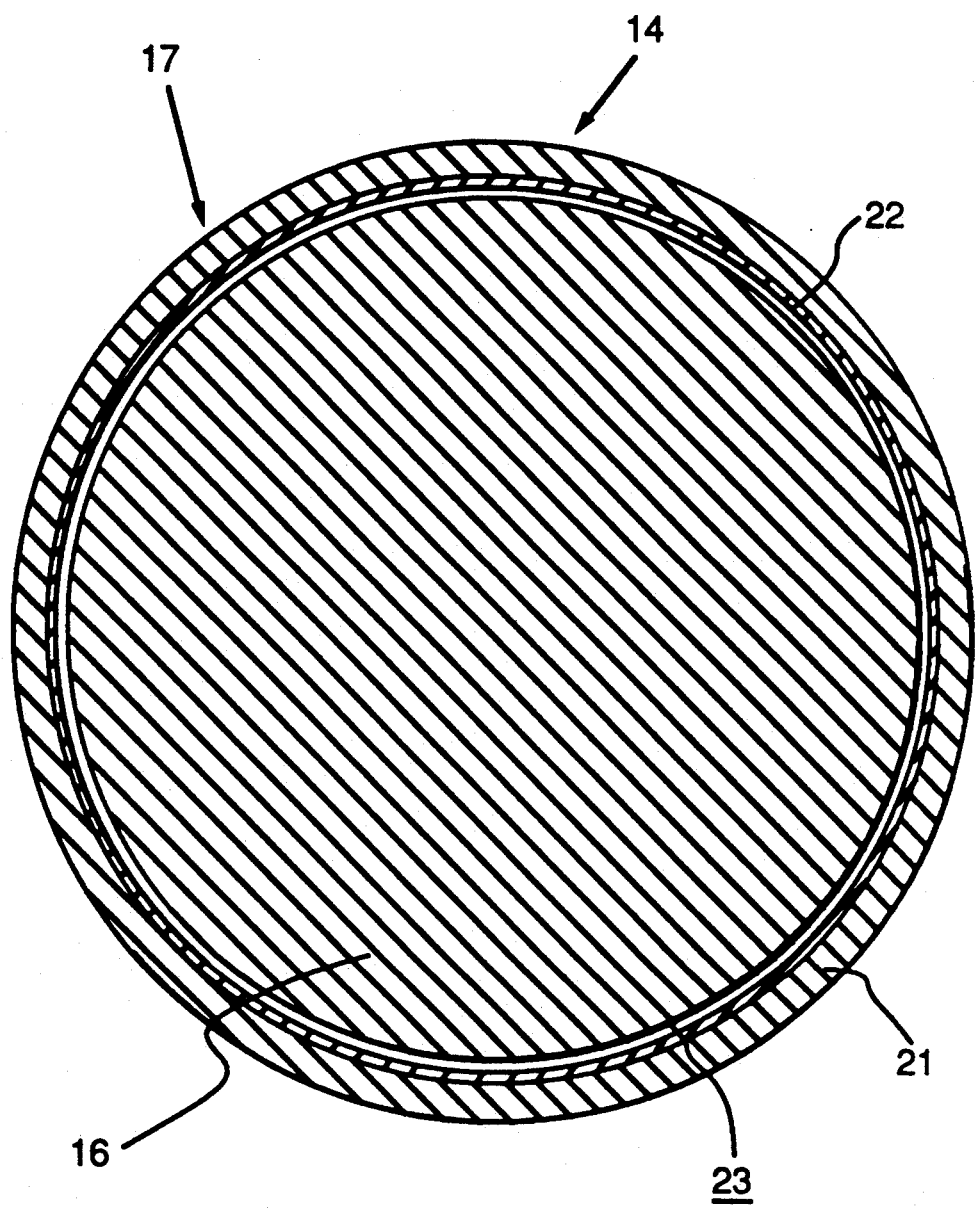
FIG. 1 is a cross section of a nuclear fuel rod having a barrier layer bonded to the inside of the fuel rod cladding.

Referring to FIG. 1, a nuclear fuel material 16 forming the central core of a fuel element 14 is surrounded by a cladding container 17, which is a composite cladding. The composite cladding container 17 encloses the core 16 so as to leave a gap 23 between the core and the cladding container. The composite cladding container 17 is comprised of a conventional zirconium alloy tube 21, for example formed from Zircaloy-2 or Zircaloy-4. The alloy tube 21 has bonded on the inside surface thereof a barrier layer 22 so that the barrier layer 22 forms a shield between the alloy tube 21 and the nuclear fuel material 16 facing the barrier 22. The barrier layer 22 forms about 1 to about 30 percent of the thickness of the cladding and is characterized by low neutron absorption. The barrier 22 protects the zirconium alloy tube portion of the cladding from contact and reaction with gases and fission products from the nuclear fuel, and minimizes the localized stress and strain on the cladding from the expansion of the nuclear fuel. The improved corrosion resistance and good ductility, as compared to sponge zirconium, of the alloys of this invention make the alloys especially suitable for use as the barrier layer 22 in the nuclear fuel cladding.

In the following examples, sheet samples of sponge zirconium and high-purity zirconium were compared to alloys of sponge zirconium and high-purity zirconium comprised of tin, bismuth, or bismuth and niobium. Conventionally processed plates of the sponge zirconium, high-purity zirconium, or zirconium alloys about 1.3 centimeters thick were obtained. The composition of the plates is shown in the Tables below, where the term "sponge" means the moderate-purity zirconium. Some of the plates were cold reduced to 0.762 millimeter thick sheet, and annealed at 576° C. for 2 hours in vacuum. Some plates were given the same processing, but were beta quenched prior to the cold reduction and annealing. The beta quenching was performed by heating the plates to about 1000° C. for 1 minute, and rapidly cooling the plate by quenching in water.

Tests for both uniform corrosion resistance and nodular corrosion resistance were conducted on samples about 0.762 by 11.2 by 22.5 millimeters cut from the sheet. Resistance to uniform corrosion was measured by exposing samples to steam at 400° C., and 1500 psig for 7 days, conditions which can produce the uniform corrosion in an accelerated test that is found on cladding in the core of a nuclear reactor. Resistance to nodular corrosion was measured by exposing samples to steam at 1500 psig, and 410° C. for 4 hours, followed by 520° C. for 16 hours, conditions which can produce the nodular corrosion that is sometimes found on cladding in the core of a nuclear reactor.

Samples were also tested under conditions that are believed to promote stress corrosion cracking in the fuel cladding. Tension test samples were milled from the sheet, and tested in a conventional stress corrosion cracking test, see L. F. Coffin, "Localized Ductility Method for Evaluating Zircaloy-2 Cladding," ASTM STP 681, 1977, p. 72, and D. S. Tomalin, "Localized Ductility of Irradiated Zircaloy-2 Cladding in Air and Iodine Environments," ASTM STP 633, 1976, pp. 557–572. The test samples were heated to 280° C. and exposed to an atmosphere of argon or iodine while being strained in tension. The tension test was performed as a slow strain rate test, straining at about 1 mil per minute to failure. In addition, the alloys of this invention were tested for hydriding resistance, another factor that is believed to promote stress corrosion cracking in the cladding. Samples were heated to 365° C. in a hydrogen atmosphere comprised of 3 percent water for 1 to 4 weeks, and the hydrogen absorbed in the sample was measured. The hydrogen absorption was measured by the conventional Leco fusion technique.

EXAMPLE 1

Figure 2:
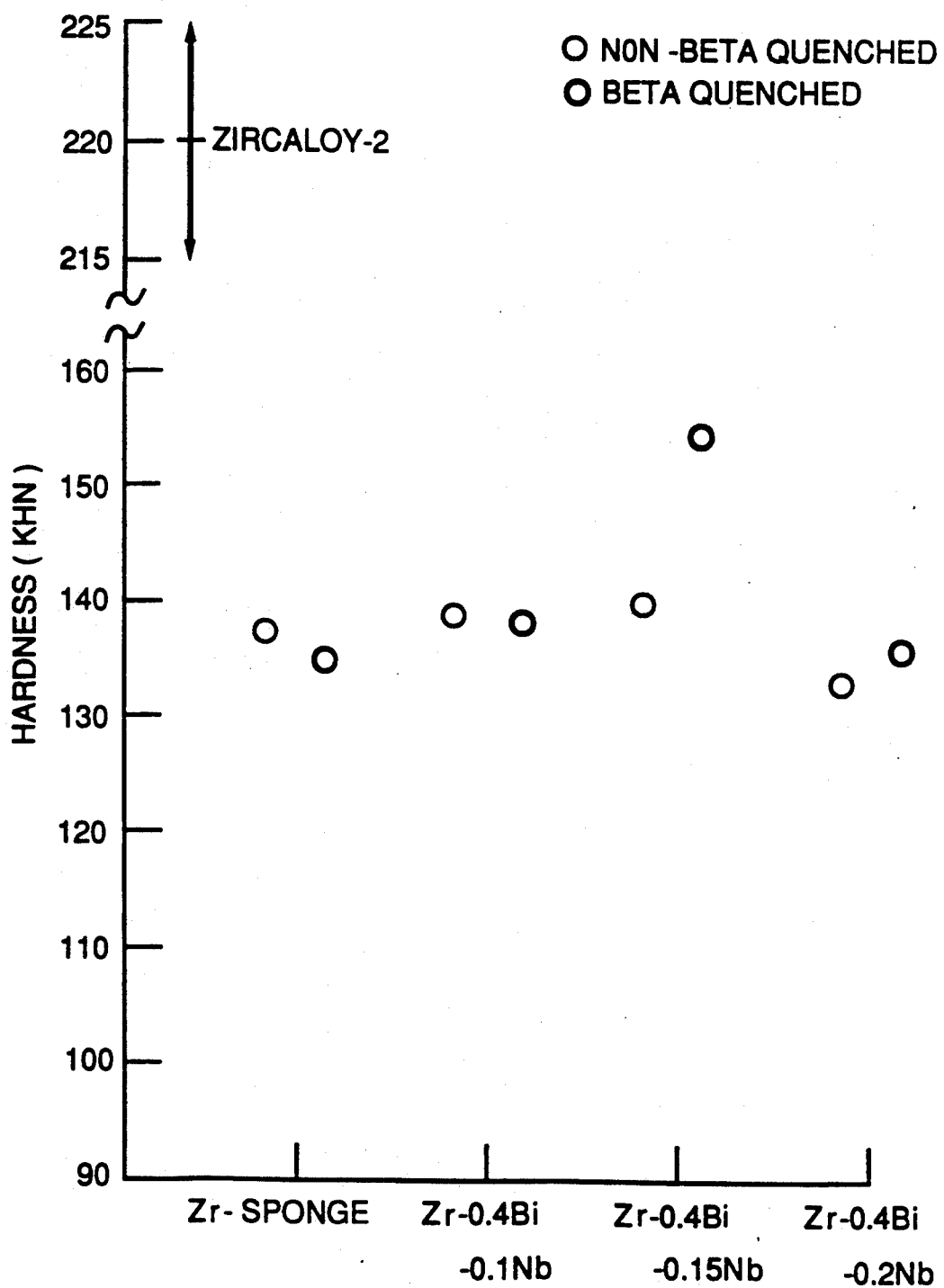
FIG. 2 is a graph showing the hardness of Zircaloy-2, sponge zirconium, and zirconium alloys comprised of bismuth and niobium.

The Knoop Hardness Number (KHN) was determined for samples of the annealed sheet on the longitudinal surface using a 300 gram load in conformance with the Knoop Hardness Test Method, ASTM E 384, 1991 Annual Book of ASTM Standards, Vol. 03.01. The hardness test results are shown in FIG. 2 where hardness is plotted on the ordinate, and the sample composition is shown on the abscissa.

EXAMPLE 2

Table I below lists the composition of the sheet samples of alloys of this invention, and a sponge zirconium sheet sample. The weight gain from uniform corrosion testing is shown for each sample.

TABLE I

| | | | Weight Gain From Uniform Corrosion Test | | |
|---|---|---|---|---|---|
| Sn | Bi | Nb | Zr | Weight Gain (mg/dm$^2$) | Comment |
| | | | Sponge | 966 | Spalling Oxide |
| 0.5 | | | Bal. | 1251 | Spalling Oxide |
| | 0.4 | 0.1 | Bal. | 1115 | |
| | 0.4 | 0.15 | Bal. | 944 | Edge Corrosion |
| | 0.4 | 0.2 | Bal. | 885 | Edge Corrosion |

EXAMPLE 3

Table II below lists the composition of the sheet samples of alloys of this invention, and a sponge zirconium sheet sample. The weight gain from nodular corrosion testing is shown for each sample.

TABLE II

| | | | Weight Gain From Nodular Corrosion Test | | |
|---|---|---|---|---|---|
| | Sn | Bi | Nb | Zr | Weight Gain (mg/dm$^2$) | Comment |
| | | | | Sponge | 6952 | Nodules |
| | 0.25 | | | Bal. | 5120 | Nodules |
| | 0.50 | | | Bal. | 5223 | Nodules |
| | 0.75 | | | Bal. | 5455 | Nodules |
| | 1.0 | | | Bal. | 6320 | Nodules |
| | | 0.5 | | Bal. | 2141 | Few Nodules |
| | | 0.4 | 0.1 | Bal. | 1608 | Few Nodules |
| | | 0.4 | 0.15 | Bal. | 952 | Few Nodules |
| | | 0.4 | 0.2 | Bal. | 968 | Black Oxide |
| *BQ | | 0.4 | 0.1 | Bal. | 1595 | Few Nodules |
| *BQ | | 0.4 | 0.15 | Bal. | 684 | Black Oxide |
| *BQ | | 0.4 | 0.2 | Bal. | 862 | Black Oxide |

*BQ - Beta Quenched plates

EXAMPLE 4

Table III below lists the composition of the sheet samples of alloys of this invention, high-purity zirconium samples, and sponge zirconium sheet samples. The tensile properties under conditions that simulate stress corrosion cracking in nuclear fuel cladding, and hydriding resistance for each sample is shown. The results from a hydriding test on a sample of Zircaloy-2 is also shown for comparison.

TABLE III

Tensile and Hydriding Properties

| Zirconium | Additions Sn | Additions Bi | Additions Nb | Yield Str. (ksi) | | Uniform Elongation (percent) | Hydrogen (ppm) Exposed 1 wk | Hydrogen (ppm) Exposed 4 wk |
|---|---|---|---|---|---|---|---|---|
| Sponge | | | | Argon | 26.1 | 13.1 | 15 | 25 |
| Sponge | | | | Iodine | 21.6 | 11.8 | 21 | 32 |
| Sponge | | | | Iodine | 22.3 | 11.8 | 11 | 24 |
| Sponge | | 0.5 | | Argon | 25.9 | 6.1 | 22 | 95 |
| Sponge | | 0.5 | | Iodine | 23.7 | 6.3 | | |
| Sponge | | 0.5 | | Iodine | 28.3 | 6.1 | | |
| High-Purity | | | | Argon | 18.4 | 20.2 | 26 | 37 |
| High-Purity | | 0.1 | | Argon | 16.1 | 15.9 | 15 | 30 |
| High-Purity | | 0.5 | | Argon | 18.01 | 20.7 | 16 | 35 |
| High-Purity | | 1.0 | | Argon | 24.1 | 15.9 | 28 | 44 |
| Sponge | | 0.4 | 0.1 | Argon | 25.4 | 12.1 | 8 | 14 |
| Sponge | | 0.4 | 0.15 | | | | 12 | 14 |
| Sponge | | 0.4 | 0.2 | Argon | 28.7 | 5.0 | 9 | 10 |
| *BQ Sponge | | 0.4 | 0.1 | Argon | 31.9 | 10 | | |
| *BQ Sponge | | 0.4 | 0.15 | Argon | 39.1 | 10 | | |
| *BQ Sponge | | 0.4 | 0.2 | Argon | 27.4 | 8.6 | | |
| Sponge | 0.25 | | | Argon | 24.7 | 6.6 | 26 | 39 |
| Sponge | 0.5 | | | Argon | 26.4 | 8.1 | 18 | 44 |
| Sponge | 0.75 | | | Argon | 22.6 | 6.5 | 19 | 24 |
| Sponge | 1.0 | | | Argon | 32.2 | 7.8 | 21 | 25 |
| ZR-2 Tube | | | | | | | 44 | 51 |

*BQ - Beta Quenched plates

By making reference to FIG. 2 it can be seen that sponge zirconium has a relatively low hardness as compared to the conventional cladding material Zircaloy-2. It is believed the much lower hardness of sponge zirconium is one reason why it provides improved resistance to stress corrosion cracking as the barrier layer in Zircaloy-2 cladding. FIG. 2 also shows the zirconium alloys of this invention comprised of bismuth and niobium have a low hardness that is comparable to the relatively low hardness of sponge zirconium. Therefore it is believed the alloys of this invention will improve resistance to stress corrosion cracking in a manner comparable to sponge zirconium.

The corrosion testing results in Tables I and II above, show that the alloys of this invention containing bismuth and niobium have improved corrosion resistance over sponge zirconium, and alloys comprised of tin and zirconium. The samples of sponge zirconium, or tin-zirconium alloys exhibited heavy nodular corrosion and weight gains of over 5000 mg/dm$^2$, as compared to the few nodules and less than 2000 mg/dm$^2$ weight gain found on the samples of alloys of this invention after the nodular corrosion test.

From Table III above, it can be seen that the alloys of this invention have ductility, as measured by uniform elongation, that is comparable to sponge zirconium. It is believed that high ductility is another important property for improving resistance to stress corrosion cracking in the cladding. Sponge zirconium samples comprised of 0.5 percent bismuth had a uniform elongation about half the uniform elongation of the sponge zirconium samples. Surprisingly, alloys of this invention comprised of bismuth and niobium had a uniform elongation that was comparable to the uniform elongation of sponge zirconium. Both beta quenched and non-beta quenched samples of alloys of this invention had ductility comparable to sponge zirconium. The comparable corrosion resistance and ductility of beta quenched as compared to non-beta quenched samples, shows the relative insensitivity to heat treatment of the alloys of this invention.

Alloys of this invention also have a higher hydriding resistance as compared to sponge zirconium comprised of bismuth, high-purity zirconium comprised of bismuth, sponge zirconium comprised of tin, and Zircaloy-2 tubing. Since hydriding resistance has been shown to be related to stress corrosion cracking, the alloys of this invention should have improved resistance to stress corrosion cracking.

What is claimed is:

1. A corrosion resistant alloy for the inner barrier liner in nuclear fuel cladding consisting essentially of; in weight percent, about 0.1 to less than 0.5 percent bismuth, about 0.1 to less than 0.5 percent niobium, and the balance substantially zirconium, the alloy having ductility and hardness comparable to sponge zirconium.

2. A corrosion resistant alloy according to claim 1 having a Vickers hardness of less than about 155 KHN.

3. A corrosion resistant alloy according to claim 1 wherein niobium is about 0.1 to 0.3 weight percent.

4. A corrosion resistant alloy according to claim 1 wherein niobium is about 0.1 to 0.2 weight percent.

5. A nuclear fuel cladding comprising an outer tube of a Zircaloy alloy, and an inner liner of an alloy consisting essentially of, in weight percent, about 0.1 to less than 0.5 percent bismuth, about 0.1 to less than 0.5 percent niobium, and the balance substantially zirconium, the liner alloy having ductility and hardness comparable to sponge zirconium.

6. A nuclear fuel cladding according to claim 5 wherein the liner alloy has a Vickers hardness of less than about 155 KHN.

7. A nuclear fuel cladding according to claim 5 wherein the niobium is about 0.1 to 0.3 weight percent.

8. A nuclear fuel cladding according to claim 5 wherein the niobium is about 0.1 to 0.2 weight percent.

* * * * *